United States Patent
Head et al.

(10) Patent No.: US 11,580,690 B1
(45) Date of Patent: Feb. 14, 2023

(54) HORIZON-BASED NAVIGATION

(71) Applicant: Raytheon Company, Waltham, MA (US)

(72) Inventors: James N. Head, Tucson, AZ (US); Wenkai Qin, Tucson, AZ (US); Jeffrey S. Klein, Fairfax, VA (US); Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/463,254

(22) Filed: Aug. 31, 2021

(51) Int. Cl.
    *G06T 15/20*      (2011.01)
    *G01C 21/00*      (2006.01)

(52) U.S. Cl.
    CPC .......... *G06T 15/20* (2013.01); *G01C 21/3833* (2020.08)

(58) Field of Classification Search
None
See application file for complete search history.

(56) References Cited

U.S. PATENT DOCUMENTS

| | | | |
|---|---|---|---|
| 8,766,975 B2 | 7/2014 | Mohr et al. | |
| 9,105,115 B2 | 8/2015 | Feyereisen et al. | |
| 9,134,127 B2 | 9/2015 | Soubra et al. | |
| 9,165,362 B2 | 10/2015 | Siewerdsen et al. | |
| 9,240,046 B2 | 1/2016 | Carrell et al. | |
| 10,151,588 B1 | 12/2018 | Singh et al. | |
| 10,605,606 B2 | 3/2020 | Ma | |
| 10,705,528 B2 | 7/2020 | Wierzynski et al. | |
| 11,300,667 B1* | 4/2022 | Feru | .......... G01S 7/484 |
| 2016/0277651 A1* | 9/2016 | Sherman | ............... G06V 20/56 |
| 2018/0253820 A1* | 9/2018 | Knott | ..................... G06T 3/0062 |

(Continued)

FOREIGN PATENT DOCUMENTS

| | | |
|---|---|---|
| AU | 2019301133 A1 | 1/2021 |
| CN | 106920215 B | 3/2020 |

(Continued)

OTHER PUBLICATIONS

Arvidson, R E, et al., "Localization and physical properties experiments conducted by Spirit at Gusev crater", Science, 305, (2004), 821-824.

(Continued)

*Primary Examiner* — Frank S Chen
(74) *Attorney, Agent, or Firm* — Schwegman Lundberg & Woessner, P.A.

(57) ABSTRACT

Systems, devices, methods, and computer-readable media for horizon-based navigation. A method can include receiving image data corresponding to a geographical region in a field of view of an imaging unit and in which the device is situated, based on the received image data, generating, by the processing unit, an image horizon corresponding to a horizon of the geographical region and from a perspective of the imaging unit, projecting three-dimensional (3D) points of a 3D point set of the geographical region to an image space of the received image data resulting in a synthetic image, generating, by the processing unit, a synthetic image horizon of the synthetic image, and responsive to determining the image horizon sufficiently correlates with the synthetic image horizon, providing a location corresponding to a perspective of the synthetic image as a location of the processing unit.

20 Claims, 7 Drawing Sheets

(56) References Cited

U.S. PATENT DOCUMENTS

| | | | |
|---|---|---|---|
| 2018/0365805 A1* | 12/2018 | Owechko | G06T 7/194 |
| 2019/0317974 A1* | 10/2019 | Chamberlin | G06F 16/29 |
| 2020/0020115 A1 | 1/2020 | Ely | |
| 2020/0082554 A1* | 3/2020 | Wang | G06T 3/4007 |
| 2020/0175326 A1* | 6/2020 | Shen | G05D 1/0253 |
| 2021/0104055 A1 | 4/2021 | Ni et al. | |

FOREIGN PATENT DOCUMENTS

| | | |
|---|---|---|
| EP | 2823463 B1 | 5/2019 |
| EP | 3742399 A1 | 11/2020 |
| JP | 6215851 B2 | 9/2017 |
| JP | 6660659 B1 | 2/2020 |
| JP | 6700519 B1 | 5/2020 |
| WO | WO-2020014341 A1 | 1/2020 |

OTHER PUBLICATIONS

Cozman, F, et al., "Outdoor visual position estimation for planetary rovers", Auton. Robots, 9, (2000), 135-150.

Cozman, F, et al., "Position estimation from outdoor visual landmarks for teleoperation of lunar rovers Appl.", Proceedings Third IEEE Workshop on Applications of Computer Vision, (1996), 156-161.

Gaskell, R W, et al., "Characterizing and navigating small bodies with imaging data", Meteoritics & Planetary Science 43, Nr 6, (2008), 1049-1061.

Li, Rongxing, et al., "MER Spirit rover localization: Comparison of ground image- and orbital image-based methods and science applications", J. Geophys. Res., 116, (2011), 12 pgs.

Palmer, E E, et al., "Location identification using horizon matching", Lun. Planet. Sci. Conf. 43, #2325, (2012), 2 pgs.

Palmer, E E, et al., "Mercator—Autonomous navigation using panoramas", Lun. Planet. Sci. Conf. 45, 2453, (2014), 2 pgs.

Palmer, E E, et al., "Mercator—Using High Resolution Topography for Navigation", Lun. Planet. Sci. Conf. 44, 2650, (2013), 2 pgs.

Palmer, E E, et al., "Mercator—Independent rover localization using stereophotoclinometry and panoramic images", Earth and Space Science, 3, (2016), 488-509.

* cited by examiner

US 11,580,690 B1

HORIZON-BASED NAVIGATION

TECHNICAL FIELD

Embodiments described herein generally relate to navigation using horizon matching. Embodiments can operate in any geographical region for which a registered three-dimensional (3D) point set is available. Embodiments can operate in geographical regions in which other navigation strategies, such as those that include communication with a satellite, are not possible.

BACKGROUND

In some situations, such as tactical environments or medical situations, to navigate without a typical navigation system. Typical navigation systems include a global navigation satellite system (GNSS) (e.g., global positioning system (GPS), Galileo, or the like), map and compass, or the like. Such navigation systems can fail for a variety of reasons, such as by being denied by the natural environment or by an adversary. For example, an urban canyon can distort a local magnetic field rendering a magnetic compass solution unreliable. An urban canyon can also cause multipath effects rendering a GNSS solution unreliable. Meanwhile, the personnel relying on the navigation can need accurate position information.

DETAILED DESCRIPTION

Figure 1:
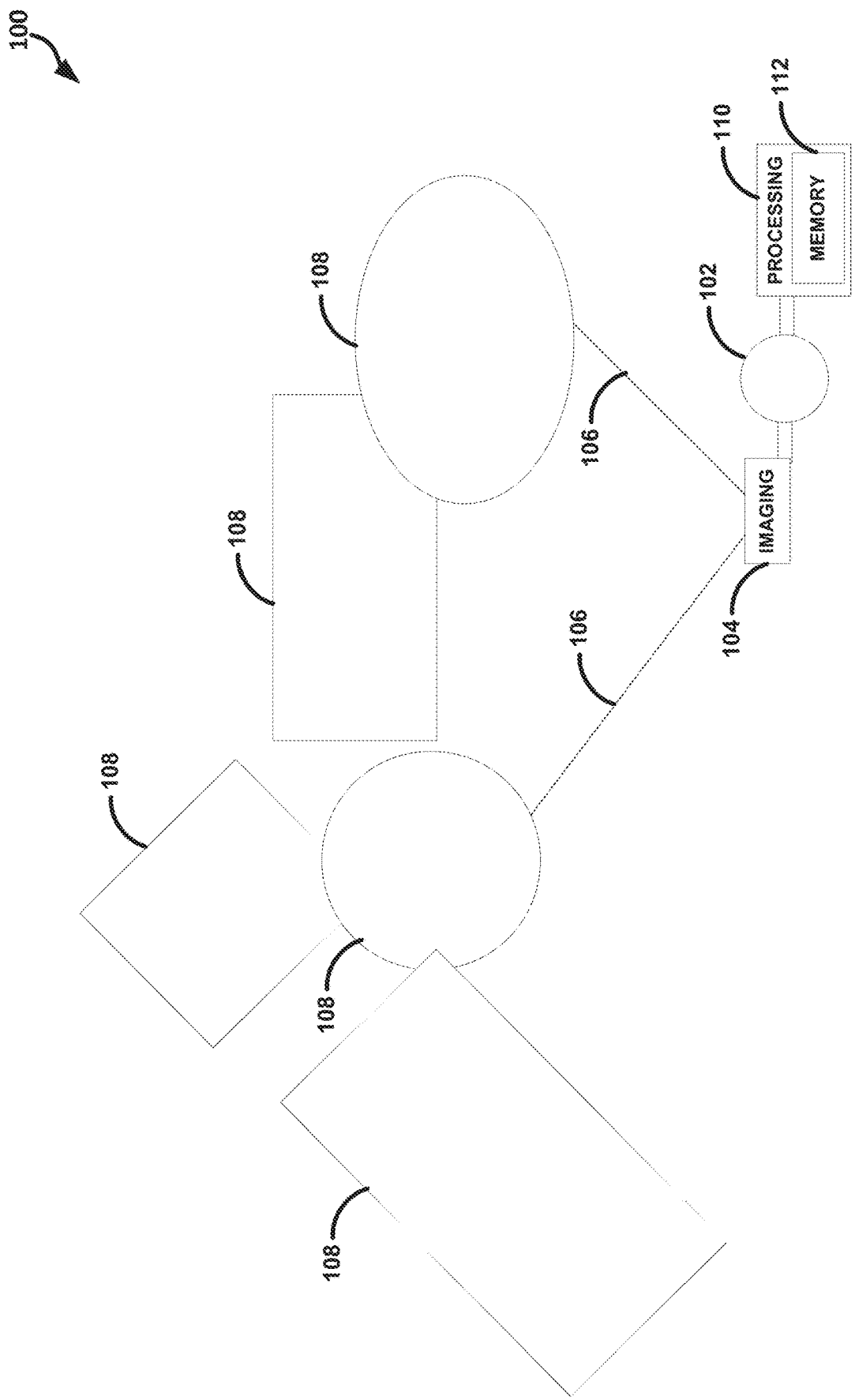
FIG. 1 illustrates, by way of example, a block diagram of an embodiment of a portion of a system for navigation.

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

In Palmer, E. E., J. N. Head, R. W. Gaskell, M. V. Sykes, and B. McComas (2016), Mercator—Independent rover localization using stereo photoclinometry and panoramic images, Earth and Space Science, 3, 488-509, doi:10.1002/, Palmer et al. present a method of navigation. Palmer et al. generated a 3D model of terrain using stereo photoclinometry on images from airborne or spaceborne vehicles. From the model, Palmer et al. extracted a suite of synthetic panoramas on a defined grid. Ground level field images were acquired and mosaicked into panoramas, aligned in azimuth, then compared via least squares analysis to generate a solution surface, the highest point of which is the navigation solution. This method is challenged in urban environments (vertical features) and requires a full or near full panorama from the field to obtain a valid comparison.

A technique in accord with embodiments, Digital Scene Matching Area Correlator (DSMAC), uses nadir imaging, not horizon imaging or matching, for navigation. DSMAC use images that are evaluated against a base map via binarization, fast Fourier transformation (FFT), and 2D correlation. The location corresponding to the correlation peak is used as the navigation solution Embodiments can use a 3D model of a geographical region to generate a suite of synthetic horizons/skylines, such as on a grid. The horizon can be defined as the highest point in each column of pixels that is deemed to be an edge by an edge detection technique. A single ground level field image, with rough azimuthal pointing, a rough location estimate (e.g., at a state, county, country, continent, neighborhood, or other level), or a combination thereof, can be used to orient the 3D model (e.g., 3D point set) and help reduce a search space. Horizons of the field image can be compared to the suite of synthetic horizons. A matching score determined via two-dimensional (2D) correlation can be determined. The matching score can be weighted by autonomous evaluation of the quality of the synthetic horizon (e.g., to eliminate confusing features, such as foliage). Each portion of the synthetic horizon can be evaluated for dispersion as an indicator of multiple instances of a same horizon point. Broadband color or hyperspectral data can be used to identify and de-weight foliage in the horizon. A field test demonstrated that with an accurate 3D model that embodiments produce an improved navigation solution. Embodiments provide improvements over prior navigation solutions by reducing compute bandwidth required, increasing accuracy of the navigation result, reducing constraints on field of view required to accurately determine location, among other improvements. Embodiments will now be described with reference to the FIGS.

FIG. 1 illustrates, by way of example, a block diagram of an embodiment of a portion of a system 100 for navigation. The system 100 as illustrated includes a user 102 with an imaging unit 104 and a processing unit 110 in a geographical environment comprised of objects 108. The user 102 is an entity capable of operating the imaging unit 104, such as a person, drone, robot, or the like. The user 102 can have a desire or need to obtain their geographic location.

The imaging unit 104 and the processing unit 110 can be part of same or different devices. The imaging unit 104 can include a camera or other device capable of gathering spectra data corresponding to a field of view (indicated by dashed lines 106) of the imaging unit 104. The imaging unit 104 can generate an image 220 (see FIG. 2) of the geographical environment within the field of view. The image 220 can be a color, greyscale, infrared, thermal, multispectral, spectral (finer resolution in wavelength than multispectral), or another image.

The processing unit 110 can include processing circuitry configured to perform operations for navigation using horizon matching. The processing unit 110 can be communicatively coupled to the imaging unit 104. The image unit 104 can provide image data of the image 220 (see FIG. 2) to the processing unit 110. The processing circuitry can include one or more transistors, resistors, diodes, capacitors, inductors, logic gates (e.g., AND, OR, XOR, negate, buffer, or the like), switches, oscillators, processing devices (e.g., a central processing unit (CPU), graphics processing unit (GPU), application specific integrated circuit (ASIC), field programmable gate array (FPGA), or the like), amplifiers, analog to digital converters, digital to analog converters, power supplies, or the like.

The processing unit 110 can include a memory device 112. The memory device 112 can include a 3D point set stored thereon. The 3D point set can indicate elevation and position information of a surface of the geographical region about the user 102. The surface can be a natural surface of the Earth (or other planetary body, such as another planet, moon, rock, or the like) or an object (e.g., a building or other manmade structure, flora, fauna, or the like) on the surface of the Earth. The 3D point set can be generated using photoclinometry, photogrammetry, light detection and ranging (LIDAR), or the like.

Figure 2:
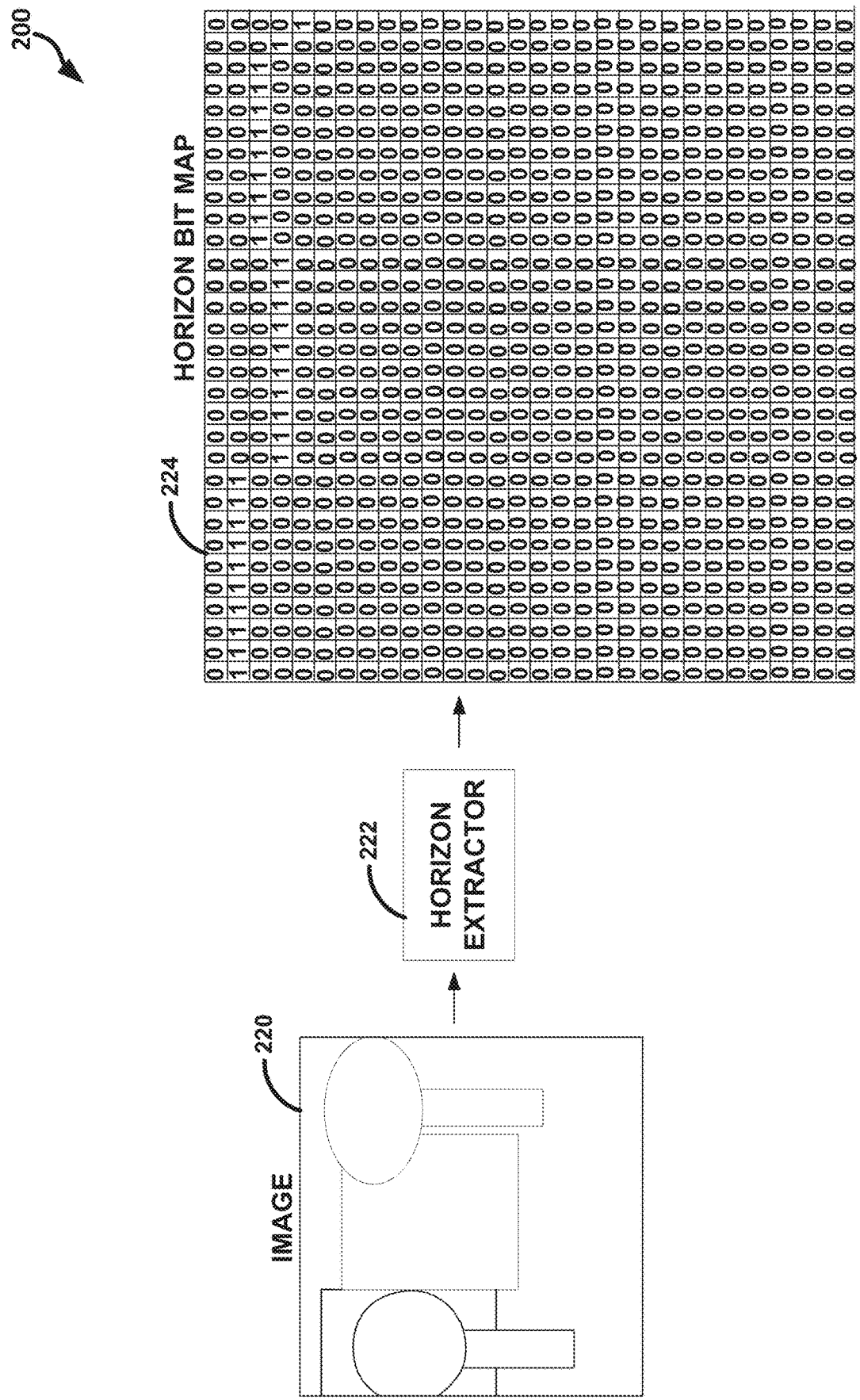
FIG. 2 illustrates, by way of example, a block diagram of an embodiment of generating a horizon image based on a received image.

The processing unit 110 can receive the image 220 (see FIG. 2). The processing unit 110 can generate a horizon bit map 224 (see FIG. 2) based on the image 220 generated by the imaging unit 104. The processing unit 110 generate a synthetic image based on the 3D point set, a pointing angle of the imaging unit 104, and approximate position of the imaging unit 104. The processing unit 110 can generate a second horizon bit map based on the synthetic image. The processing unit 110 can determine a location of the user 102 based on a correlation of the first and second horizon bit maps.

FIG. 2 illustrates, by way of example, a block diagram of an embodiment of a system 200 for generating a bit map 224 based on the image 220. The image 220 can be provided to the processing unit 110, as discussed previously. The image 220 can be provided to a horizon extractor 222 implemented by the processing unit 110. The horizon extractor 222 can perform edge detection on the image 220. Example edge detection techniques include Roberts edge detection, Sobel edge detection, Prewitt edge detection, Kirsch edge detection, Robinson edge detection, Marr-Hildreth edge detection, LoG edge detection, and Canny edge detection.

The result of the edge detection technique can include an image or bit map indicating locations of edges in the image, sometimes called an edge image or edge bit map. The horizon extractor 222 can then identify, for each column of pixels in the edge image or edge bit map, the highest row in the column that corresponds to an edge.

The horizon extractor 222 can, based on the horizon pixels, generate the horizon bit map 224. Each of the pixels in the horizon bit map 224 can be assigned a value that indicates whether they pixel corresponds to a horizon pixel or not. In the example of FIG. 2, horizon pixels are indicated by a one (1) and non-horizon pixels are indicated by a zero (0). The bit map 224 can thus include, for each column, a single pixel with a value that indicates that pixel as the horizon pixel for that column.

Figure 3:
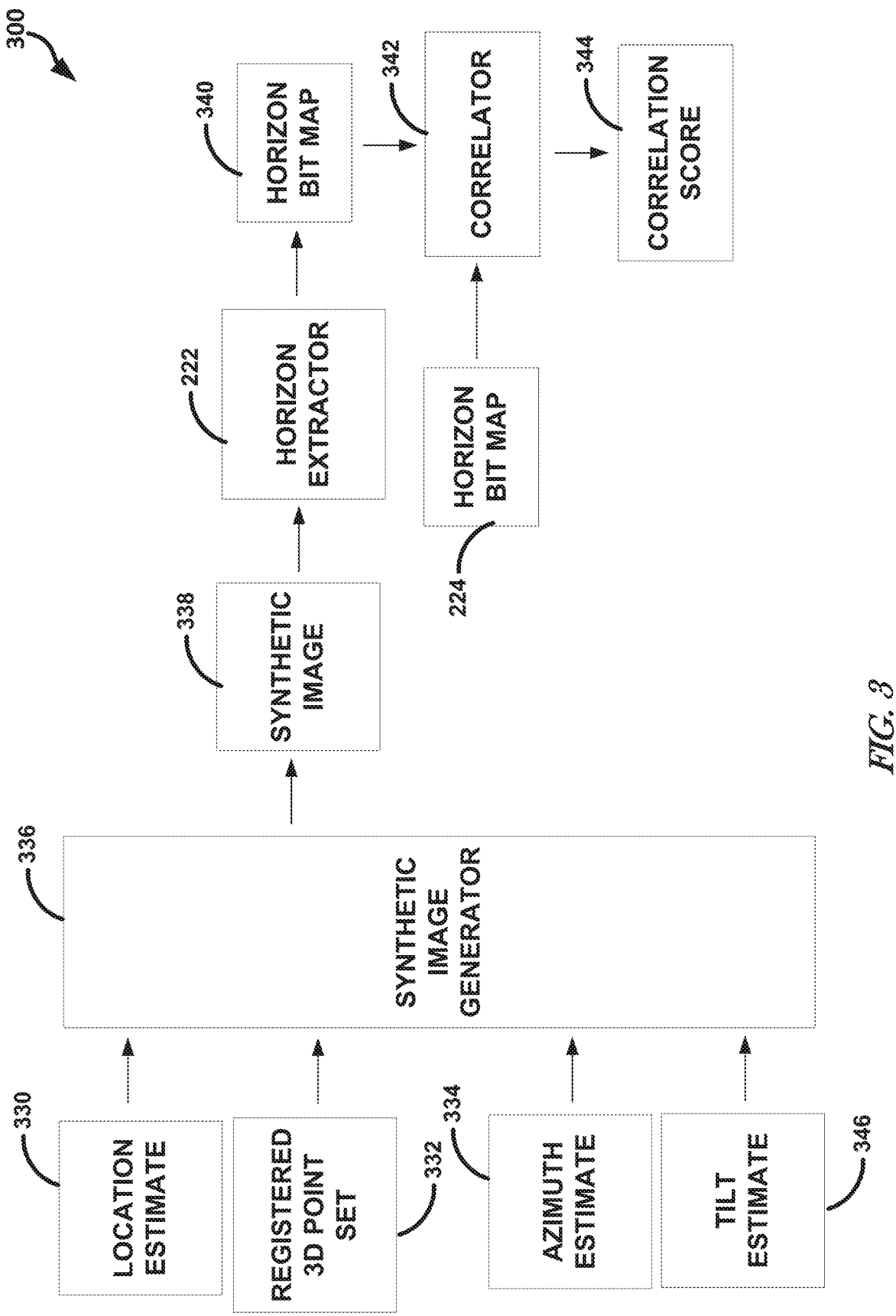
FIG. 3 illustrates, by way of example, a block diagram of a portion of a system for navigation.

FIG. 3 illustrates, by way of example, a block diagram of a portion of a system 300 for navigation. The system 300 as illustrated includes a synthetic image generator 336, the horizon extractor 222, and a correlator 342. One or more of the synthetic image generator 336, the horizon extractor 222, or the correlator 342 can be implemented by the processing unit 110 (see FIG. 1), the imaging unit 104 (see FIG. 1), or another device in communication with the imaging unit 104, the processing unit 110, or a combination thereof.

The synthetic image generator 336 can receive the registered 3D point set 332 and generate a synthetic image 338 based on a location estimate 330, azimuth estimate 334, or a combination thereof. The registered 3D point set 332 can be from the memory 112 or communicated by circuitry communicatively coupled to the processing unit 110. The registered 3D point set 332 can be generated using a photogrammetric, photoclinometry, LIDAR, or other technique. "Registered" in this context means that the data points of the 3D point set 332 are in a same coordinate system as the imaging unit 104 so that locations in the 3D point set 332 correspond to about the same locations in the image 220.

The 3D point set 332 can be a subset of a 3D point set with more data points. The 3D point set 332 can be less dense or have less resolution than the 3D point set from which the 3D point set 332 was taken or derived. Reducing the data points in the 3D point set 332 can help reduce an amount of memory consumed in storing the 3D point set 332. Reducing the 3D point set 332 can thus increase a number of devices on which the 3D point set 332 can be stored, making embodiments useable in more field situations.

The location estimate 330 can be known a priori, provided by a device associated with or carried by the user 102, provided a reconnaissance device (e.g., a drone, a plane, satellite, or the like), a device of another entity that has visible verifications of the location of the user 102, a product of dead reckoning, or the like. The location estimate 330 can be provided in metadata of the image 220, along with the image 220, or in a communication separate from the image 220. The location estimate 330 can help reduce a search space over which horizon matching is employed to better determine the location of the user 102. The location estimate 330 can be at a state, county, country, territory, continent, neighborhood, park, a portion or combination thereof, or other level.

The azimuth estimate 334 can be an estimate of an angle, relative to true north, at which the imaging unit 104 captured the image 220. The azimuth estimate 334 can be used to help orient the image 220. The synthetic image is already oriented in azimuth since it derived from a registered map. By using the azimuth estimate 334, the number of possible orientations for the field image 220 is reduced, which reduces a maximum number of synthetic images 338 used to obtain the navigation solution.

The synthetic image generator 336 can generate a synthetic image 338 based on the registered 3D point set 332. The synthetic image generator 336 can select a subset of the 3D point set 332 to use in generating the synthetic image 338 based on the location estimate 330. The synthetic image generator 336 can produce an image (e.g., oriented in about a same azimuth as the image 220 after the image 220 is adjusted based on the azimuth).

The tilt estimate 346 can be an estimate of an angle, relative to horizontal (e.g., the x-y plane), at which the imaging unit 104 captured the image 220. The tilt estimate 346 can be used by the synthetic image generator 336 to help orient the imaging unit 104 to the orientation of the view of the synthetic image generator 336.

Some techniques for generating a synthetic image from a 3D point set, such as the 3D point set 332, are described in U.S. Pat. No. 11,042,998, which is incorporated herein by reference in its entirety.

The synthetic image 338 can be provided to the horizon extractor 222. The horizon extractor 222 can generate a horizon bit map 340 of the synthetic image 338 in the manner described regarding FIG. 2. The horizon bit map 340 is generated based on the synthetic image 338 and the horizon bit map 224 is generated based on the image 220.

The correlator 342 can determine a correlation score 344 between the horizon bit map 340 and the horizon bit map 224. The correlation score 344 can be determined using an image correlation technique, such as a least-squares pixel matching, normalized cross correlation, or Fast-Fourier-Transform (FFT) matching technique.

Using the system 300 as described thus far will yield a correlation score 344 for a single position. To get a reliable estimate of the location of the user 102 another synthetic image about the location of the user 102 can be generated and another correlation score can be determined. This process can be repeated until (i) a correlation score that satisfies a first criterion (e.g., a specified threshold), or (ii) a specified number of correlation scores 344 have been determined for respective synthetic images 338 at different locations. The location corresponding to a point of view of the correlation score that satisfies the first criterion, or the highest correlation score can be provided as the location of the user 102.

In some instances, multiple correlation scores can satisfy the first criterion or multiple correlation scores can be sufficiently high to provide ambiguity as to which location corresponds to the actual location of the user 102. In such instances, the locations can be averaged or interpolated, with or without weights determined based on the correlation score, to generate the location of the user 102.

Figures 4, 5:
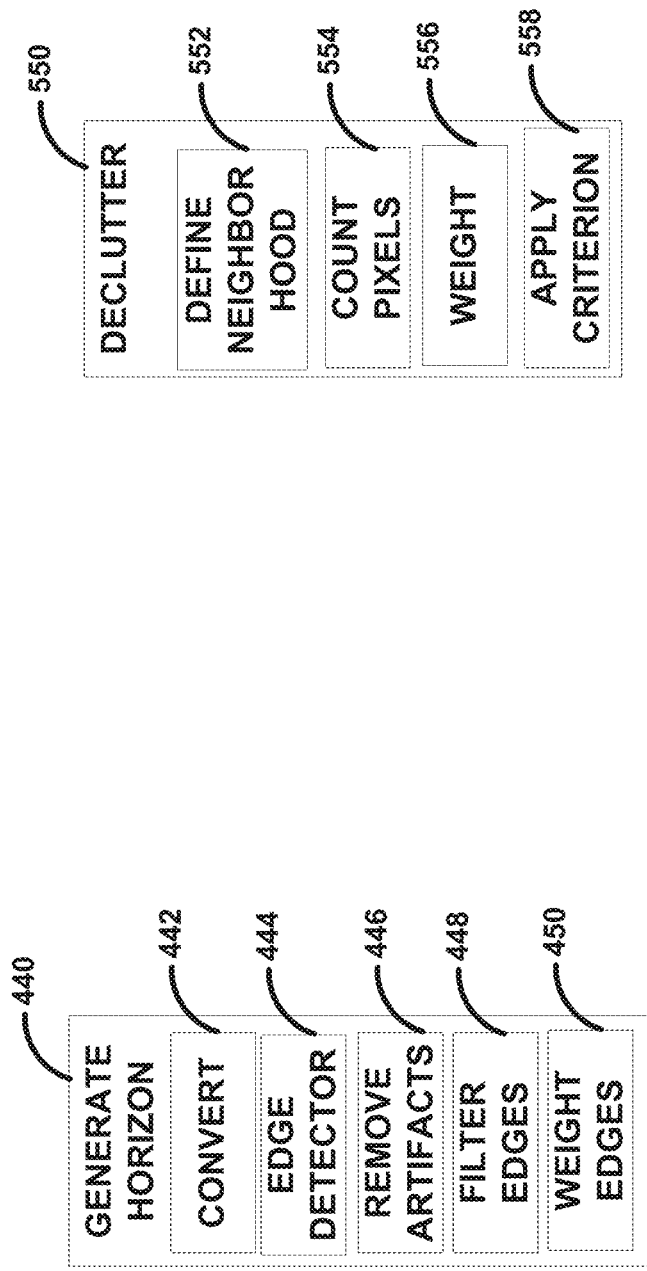
FIG. 4 illustrates, by way of example, a block diagram of a generate horizon operation.
FIG. 5 illustrates, by way of example, a block diagram of an embodiment of a decluttering operation.

FIG. 4 illustrates, by way of example, a block diagram of a generate horizon operation 440, such as can be implemented by the horizon extractor 222. The operation 440 can include converting the image 220 or the synthetic image 338 to an image format used by an edge detector technique 444. The operation 442 can include simply providing the image 220 or the synthetic image 338 to the edge detector technique 444 if it is already in the proper format. Some edge detector techniques 444 operate on greyscale images, so the operation 442 can convert the image 220 or the synthetic image 338 to greyscale.

The edge detector technique 444 identifies pixels that likely correspond to edges in the image 220 or the synthetic image 338. The edge detector technique 444 can include Roberts edge detection, Sobel edge detection, Prewitt edge detection, Kirsch edge detection, Robinson edge detection, Marr-Hildreth edge detection, LoG edge detection, Canny edge detection, or the like. A result of applying the edge detection technique is an edge image (or bit map) that indicates which pixels correspond to edges.

Artifacts, if any, of the edge detector technique 444 can be removed at operation 446. The artifacts can include floating or hazy objects, clouds, other non-structural objects that can have edges, a tree (e.g., or a branch, leaf, needle or the like thereof) obscuring the vision, or grass, which provides a lot of high-frequency noise that manifests itself like a sort of visual static. Sometimes, because of the way points in the point cloud are voxelized, the places where voxels do not really overlap can cause issues for horizon extraction. These places appear as false positives in the binary horizon generated. The operation 446 can include a Gaussian blur for an artifact with a higher frequency component. Removal of lower frequency type artifacts can include more prescriptive fixes. For example, removing a cloud can include manual alteration, pixel color analysis, or the like to help remove the cloud.

At operation 448 (e.g., after artifacts have been removed, if any), edges in the edge image can be filtered. The operation 448 can include retaining only a single edge per column of pixels in the edge image. The pixel corresponding to the highest height in the column that is also considered an edge in the edge image can be retained for that column.

At operation 450, the retained edges can be decluttered. The operation 450 can include counting how many other pixels in a neighborhood of pixels about a specified pixel are considered edge pixels and weighting the pixels according to the count. More details regarding operation 450 are provided regarding FIG. 5.

FIG. 5 illustrates, by way of example, a block diagram of an embodiment of a decluttering operation 550, such as can be implemented by the horizon extractor 222. The operation 550 as illustrated includes defining a pixel neighborhood at operation 552. The operation 552 can include defining which pixels about a given pixel that are included in a neighborhood of the pixel. The neighborhood can be a rectangle (a number of pixels in a grid of pixels centered on the specified pixel) or other shape.

At operation 554, the number of pixels in the defined neighborhood that are considered edges in the edge image can be counted. Each edge pixel can then be associated with a weight (e.g., a real number in [0, 1], or other weight, such as any real number or integer), at operation 556. An example weight can be as follows: weight=1-1/count. The count can be count determined at operation 554. Other weighting techniques are within the scope of this application.

At operation 558, an edge pixel with a weight that satisfies a specified criterion can be removed or retained. One example criterion includes retaining pixels with a weight greater than a specified threshold (e.g., 0.7 or other value) using the weight determined at operation 556.

The decluttering operation 550 provides a filtering of edge pixels that can correspond to mobile objects, such as a transient vehicle, leaves or other foliage, or other object not present in the 3D data set. Other techniques for filtering such edge pixels can include filtering foliage pixels from the image 220 or the synthetic image 338 to remove flora. Flora filtering can be performed based on spectra, color, or the like.

Figure 6:
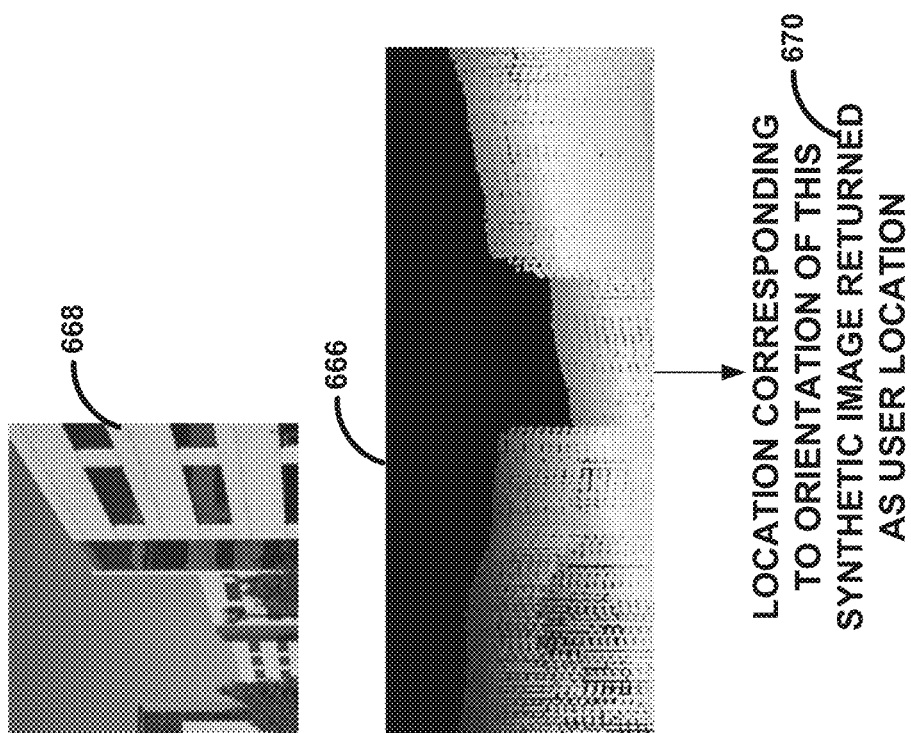
FIG. 6 illustrates, by way of example, a conceptual flow diagram of navigation in accord with embodiments.
Figure 6:
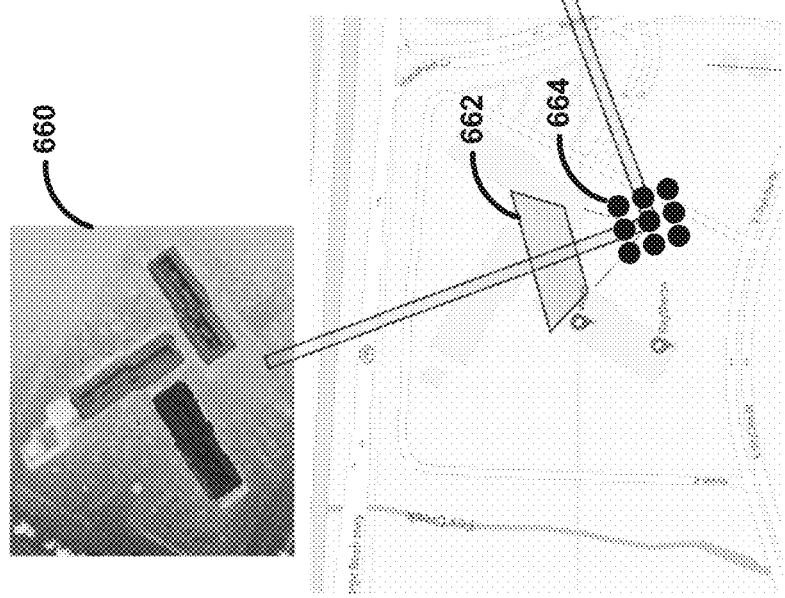

FIG. 6 illustrates, by way of example, a conceptual example of embodiments. In FIG. 6, a 3D point set 660 colorized according to height is illustrated. The illustrated 3D point set 660 is of three buildings and three parking lots. A portion of the 3D point set 660 corresponding to a location 664 estimate of the user 102 (see FIG. 1) is projected to an image space of an image 668 provided by the imaging unit 104 (see FIG. 1). The image 668 is a specific example of the image 220. The image space of the image 668 includes a perspective 662 that can include an azimuth, tilt, and the location 664. A synthetic image 666 colorized by z-data is an example of the synthetic image 338 (see FIG. 3). The horizons of the synthetic images generated at each of the locations 664 (locations indicated by black dots) can be correlated with the horizon of the image 668. The location 664 corresponding to the highest correlation score can be returned as the location of the user 102. In the example of FIG. 6, the center location of the locations 664 can be returned as the location 670 of the user 102.

Note that the horizon bit map 340 can be (e.g., intentionally) larger than the horizon bit map 224. Larger in this context means that it covers a wider field of view (FOV). The horizon bit map 340 can be a panorama, while the horizon bit map 224 can be for a narrower FOV (based on the real image 220 generated by the imaging unit 104). The horizon bit map 340 can cover a larger vertical view than the horizon bit map 224 as well. To handle such size discrepancies, correlating the horizon bit map 224 and the horizon bit map 340 can include sliding the horizon bit map 224 pixel-by-pixel across rows and columns of the horizon bit map and determining a correlation score at each location. A highest correlation score can be used as the correlation score for the horizon bit map 224 and the horizon bit map 340.

Figure 7:
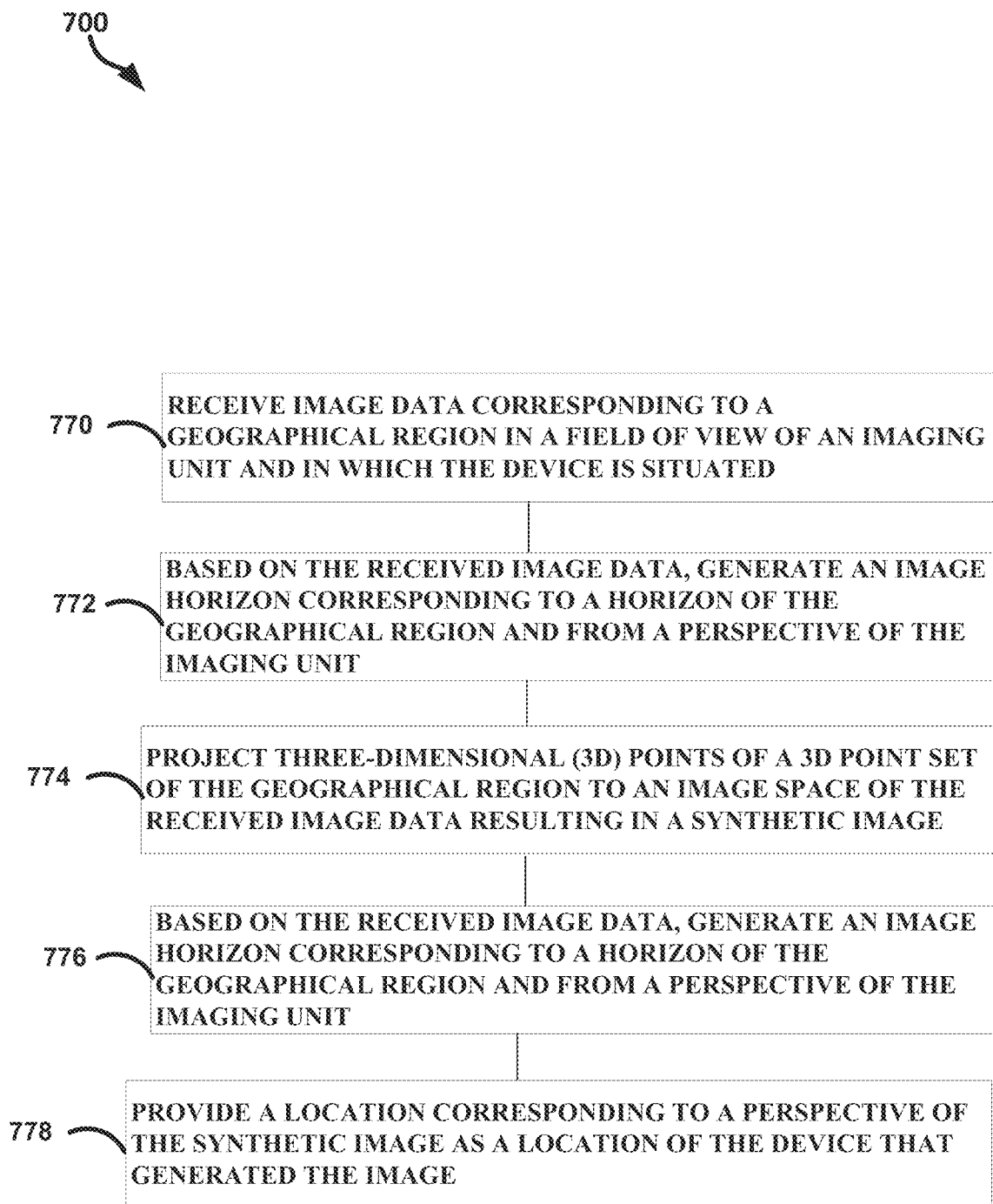
FIG. 7 illustrates, by way of example, a diagram of an embodiment of a method for navigation.

FIG. 7 illustrates, by way of example, a diagram of an embodiment of a method 700 for navigation. A computer-implemented method for navigation, the method comprising receiving (e.g., at a processing unit of a device) image data corresponding to a geographical region in a field of view of an imaging unit and in which the device is situated, at operation 770, based on the received image data, generating (e.g., by the processing unit) an image horizon corresponding to a horizon of the geographical region and from a perspective of the imaging unit, at operation 772; projecting 3D points of a 3D point set of the geographical region to an image space of the received image data resulting in a synthetic image, at operation 774; generating, by the processing unit, a synthetic image horizon of the synthetic image, at operation 776; and (e.g., responsive to determining the image horizon sufficiently correlates with the synthetic image horizon) providing a location corresponding to a perspective of the synthetic image as a location of the processing unit, at operation 778.

The image horizon can include a respective pixel value for each respective pixel that indicates whether the pixel is a horizon pixel or a non-horizon pixel. Each column of the image horizon can include a single horizon pixel that corresponds to a highest point at which an edge appears in the column. The method 700 can further include weighting respective horizon pixels of the synthetic image horizon or the image horizon based on a number of horizon pixels in a specified neighborhood of the respective horizon pixels. The method 700 can further include determining a correlation score between the weighted pixels of the image horizon and pixels of the synthetic image horizon. The method 700 can further include weighting the pixels of the image horizon based on radiometric analysis of the scene pixels reducing pixels corresponding to transient horizon objects.

The method 700 can further include generating, for respective synthetic images of a plurality of locations in the geographical region and based on the 3D point set, respective synthetic image horizons. The method 700 can further include providing a location corresponding to a perspective of the respective synthetic image that has a corresponding synthetic image horizon that correlates best with the image horizon as a location of the processing unit. The method 700 can further include reducing a number of data points in the 3D point set resulting in a reduced 3D point set. The method 700 can further include storing the reduced 3D point set on a memory of the device.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, later, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be in a single location (e.g., within a home environment, an office environment or as a server farm), while in other embodiments the processors may be distributed across several locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 8:
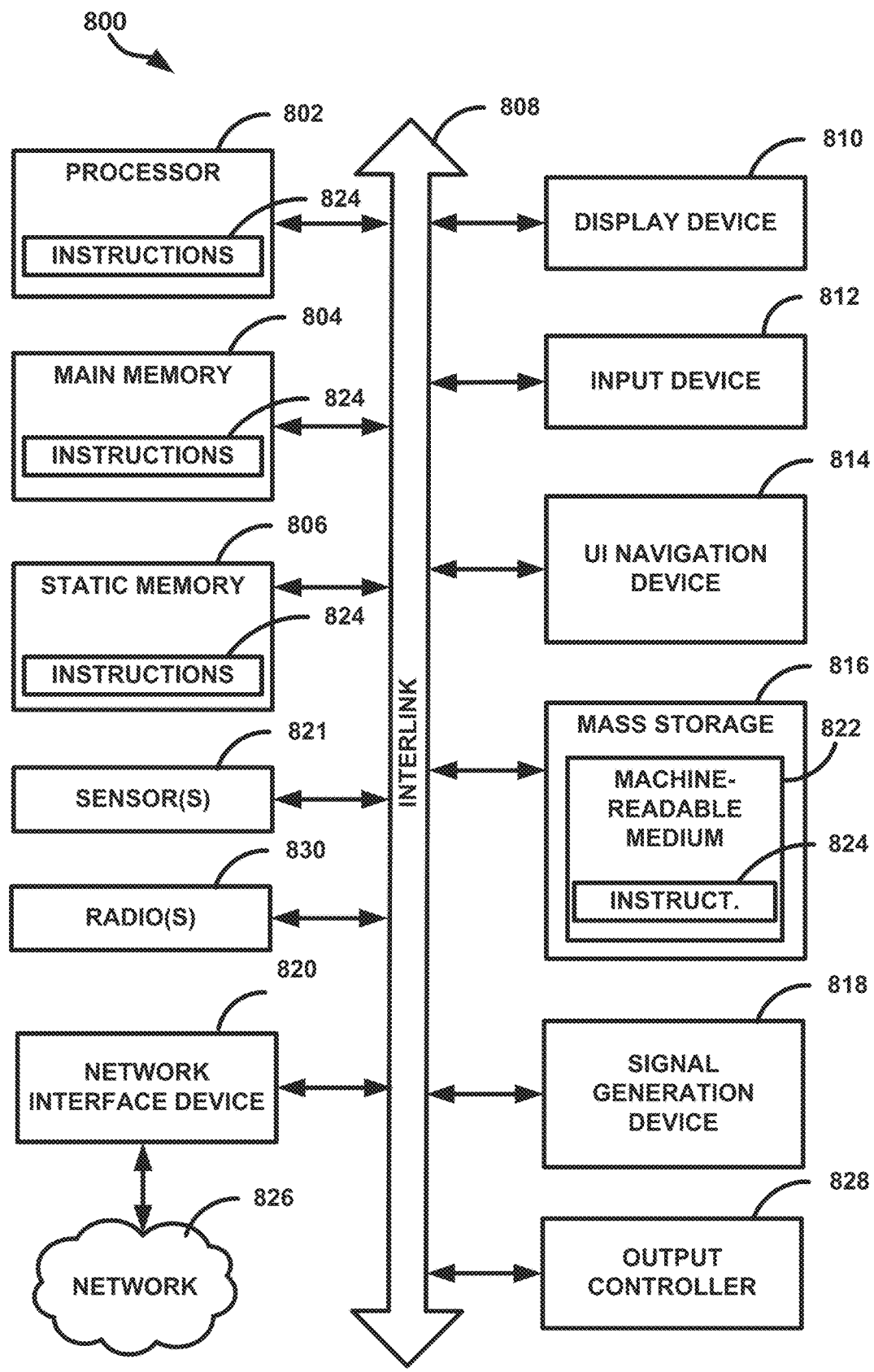
FIG. 8 illustrates, by way of example, a block diagram of an embodiment of a machine in the example form of a computer system within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. One or more of the imaging unit 104, processing unit 110, horizon extractor 222, synthetic image generator 336, correlator 342, generate horizon operation 440, or declutter operation 550, can be implemented, performed by, or include a component of the computer system 800. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 821 (e.g., a transducer that converts one form of energy (e.g., light, heat, electrical, mechanical, or other energy) to another form of energy), such as an infrared (IR), synthetic aperture radar (SAR), synthetic aperture sonar (SAS), visible, or other image sensor, or the like, or a combination thereof), or the like, or a combination thereof), a main memory 804 and a static memory 806, which communicate with each other via a bus 808. The memory 804, 806 can store parameters (sometimes called weights) that define operations of the processing circuitry 802 or other component of the system 800. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), a network interface device 820, and radios 830 such as Bluetooth, wireless wide area network (WWAN), wireless local area network (WLAN), and near field communication (NFC), permitting the application of security controls on such protocols.

The machine 800 as illustrated includes an output controller 828. The output controller 828 manages data flow to/from the machine 800. The output controller 828 is sometimes called a device controller, with software that directly interacts with the output controller 828 being called a device driver.

Machine-Readable Medium

The disk drive unit 816 includes a machine-readable medium 822 on which is stored one or more sets of instructions (e.g., and data structures or other software data) 824 embodying or utilized by any one or more of the methodologies or functions described herein. The instructions 824 may also reside, completely or at least partially, within the main memory 804, the static memory 806, and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode, or carry instructions for execution by the machine, and includes digital or analog communications signals or other intangible media to facilitate communication of such software.

Additional Example

Example 1 can include a computer-implemented method for navigation, the method comprising receiving, at a processing unit of a device, image data corresponding to a geographical region in a field of view of an imaging unit and in which the device is situated, based on the received image data, generating, by the processing unit, an image horizon corresponding to a horizon of the geographical region and from a perspective of the imaging unit, projecting three-dimensional (3D) points of a 3D point set of the geographical region to an image space of the received image data resulting in a synthetic image, generating, by the processing unit, a synthetic image horizon of the synthetic image, and responsive to determining the image horizon sufficiently correlates with the synthetic image horizon, providing a location corresponding to a perspective of the synthetic image as a location of the processing unit.

In Example 2, Example 1 can further include, wherein the image horizon includes a respective pixel value for each respective pixel that indicates whether the pixel is a horizon pixel or a non-horizon pixel.

In Example 3, Example 2 can further include, wherein each column of the image horizon includes a single horizon pixel that corresponds to a highest point at which an edge appears in the column.

In Example 4, at least one of Examples 1-3 can further include weighting respective horizon pixels of the synthetic image horizon or the image horizon based on a number of horizon pixels in a specified neighborhood of the respective horizon pixels.

In Example 5, Example 4 can further include determining a correlation score between the weighted pixels of the image horizon and pixels of the synthetic image horizon.

In Example 6, at least one of Examples 4-5 can further include weighting the pixels of the image horizon based on radiometric analysis of the scene pixels reducing pixels corresponding to transient horizon objects.

In Example 7, at least one of Examples 1-6 can further include generating, for respective synthetic images of a plurality of locations in the geographical region and based on the 3D point set, respective synthetic image horizons, and providing a location corresponding to a perspective of the respective synthetic image that has a corresponding synthetic image horizon that correlates best with the image horizon as a location of the processing unit.

In Example 8, at least one of Examples 1-7 can further include reducing a number of data points in the 3D point set resulting in a reduced 3D point set, and storing the reduced 3D point set on a memory of the device.

Example 9 can include a non-transitory machine-readable medium including instructions that, when executed by a machine, cause the machine to perform operations comprising the method of at least one of Examples 1-8.

Example 10 can include a system comprising processing circuitry, and a memory device coupled to the processing circuitry, the memory device including instructions that, when executed by the processing circuitry, cause the processing circuitry to perform operations comprising the method of at least one of one of Examples 1-8.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A computer-implemented method for navigation, the method comprising:
    receiving, at a processing unit of a device, image data corresponding to a geographical region in a field of view of an imaging unit and in which the device is situated;
    based on the received image data, generating, by the processing unit, an image horizon corresponding to a horizon of the geographical region and from a perspective of the imaging unit;
    projecting three-dimensional (3D) points of a 3D point set of the geographical region to an image space of the received image data resulting in a synthetic image;
    generating, by the processing unit, a synthetic image horizon of the synthetic image; and
    responsive to determining a correlation score between the image horizon and the synthetic image horizon is greater than a specified threshold, providing a location corresponding to a perspective of the synthetic image as a location of the processing unit.

2. The method of claim 1, wherein the image horizon includes a respective pixel value for each respective pixel that indicates whether the pixel is a horizon pixel or a non-horizon pixel.

3. The method of claim 2, wherein each column of the image horizon includes a single horizon pixel that corresponds to a highest point at which an edge appears in the column.

4. The method of claim 1, further comprising weighting respective horizon pixels of the synthetic image horizon or the image horizon based on a number of horizon pixels in a specified neighborhood of the respective horizon pixels.

5. The method of claim 4, further comprising determining the correlation score between the weighted pixels of the image horizon and pixels of the synthetic image horizon.

6. The method of claim 4, further comprising weighting the pixels of the image horizon based on radiometric analysis of the pixels reducing pixels corresponding to transient horizon objects.

7. The method of claim 1, further comprising:
generating, for respective synthetic images of a plurality of locations in the geographical region and based on the 3D point set, respective synthetic image horizons; and
providing a location corresponding to a perspective of the respective synthetic image that has a corresponding synthetic image horizon that correlates best with the image horizon as a location of the processing unit.

8. The method of claim 1, further comprising:
reducing a number of data points in the 3D point set resulting in a reduced 3D point set; and
storing the reduced 3D point set on a memory of the device.

9. A non-transitory machine-readable medium including instructions that, when executed by a machine, cause the machine to perform operations comprising:
receiving image data corresponding to a geographical region in a field of view of an imaging unit and in which the machine is situated;
based on the received image data, generating an image horizon corresponding to a horizon of the geographical region and from a perspective of the imaging unit;
projecting three-dimensional (3D) points of a 3D point set of the geographical region to an image space of the received image data resulting in a synthetic image;
generating a synthetic image horizon of the synthetic image; and
responsive to determining a correlation score between the image horizon and the synthetic image horizon is greater than a specified threshold, providing a location corresponding to a perspective of the synthetic image as a location of the machine.

10. The non-transitory machine-readable medium of claim 9, wherein the image horizon includes a respective pixel value for each respective pixel that indicates whether the pixel is a horizon pixel or a non-horizon pixel.

11. The non-transitory machine-readable medium of claim 10, wherein each column of the image horizon includes a single horizon pixel that corresponds to a highest point at which an edge appears in the column.

12. The non-transitory machine-readable medium of claim 9, wherein the operations further comprise weighting respective horizon pixels of the synthetic image horizon or the image horizon based on a number of horizon pixels in a specified neighborhood of the respective horizon pixels.

13. The non-transitory machine-readable medium of claim 12, wherein the operations further comprise determining the correlation score between the weighted pixels of the image horizon and pixels of the synthetic image horizon.

14. The non-transitory machine-readable medium of claim 12, wherein the operations further comprise weighting the pixels of the image horizon based on radiometric analysis of the pixels reducing pixels corresponding to transient horizon objects.

15. A system comprising:
processing circuitry; and
a memory device coupled to the processing circuitry, the memory device including instructions that, when executed by the processing circuitry, cause the processing circuitry to perform operations comprising:
receiving image data corresponding to a geographical region in a field of view of an imaging unit and in which the device is situated;
based on the received image data, generating an image horizon corresponding to a horizon of the geographical region and from a perspective of the imaging unit;
projecting three-dimensional (3D) points of a 3D point set of the geographical region to an image space of the received image data resulting in a synthetic image;
generating a synthetic image horizon of the synthetic image; and
responsive to determining a correlation score between the image horizon and the synthetic image horizon is greater than a specified threshold, providing a location corresponding to a perspective of the synthetic image as a location of the processing unit.

16. The system of claim 15, wherein the operations further comprise:
generating, for respective synthetic images of a plurality of locations in the geographical region and based on the 3D point set, respective synthetic image horizons; and
providing a location corresponding to a perspective of the respective synthetic image that has a corresponding synthetic image horizon that correlates best with the image horizon as a location of the processing unit.

17. The system of claim 15, wherein the operations further comprise:
reducing a number of data points in the 3D point set resulting in a reduced 3D point set, and
storing the reduced 3D point set on a memory of the device.

18. The system of claim 15, wherein the image horizon includes a respective pixel value for each respective pixel that indicates whether the pixel is a horizon pixel or a non-horizon pixel.

19. The system of claim 18, wherein each column of the image horizon includes a single horizon pixel that corresponds to a highest point at which an edge appears in the column.

20. The system of claim 15, wherein the operations further comprise weighting respective horizon pixels of the synthetic image horizon or the image horizon based on a number of horizon pixels in a specified neighborhood of the respective horizon pixels.

* * * * *